United States Patent Office 3,101,187
Patented Aug. 20, 1963

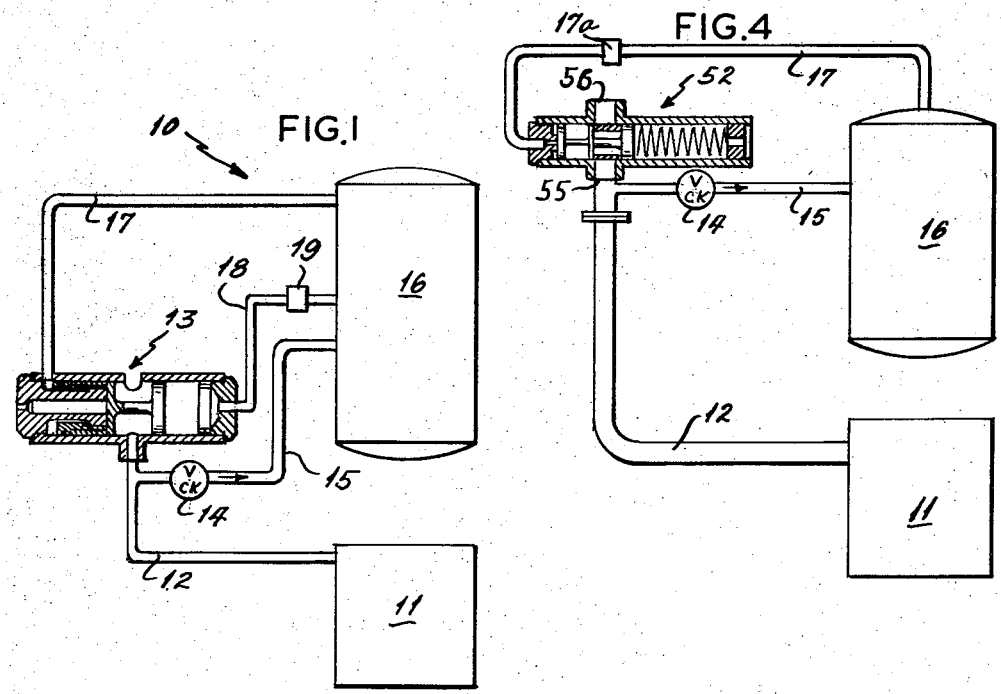
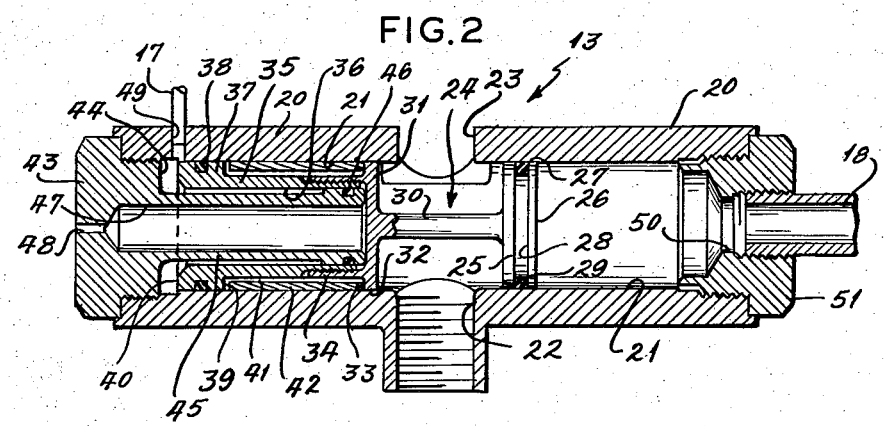

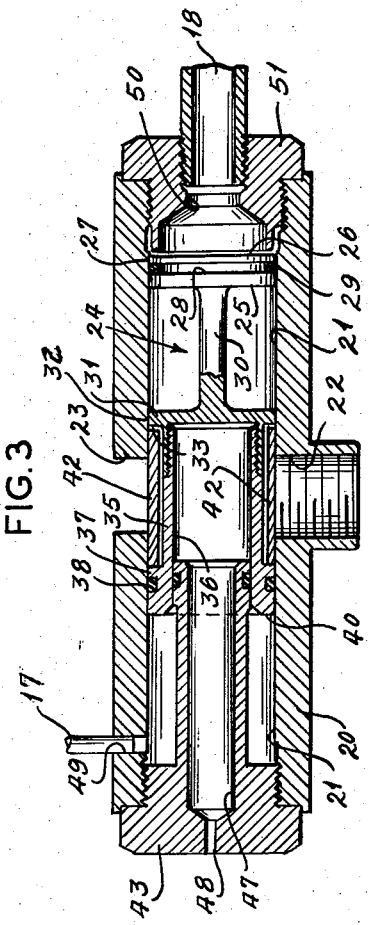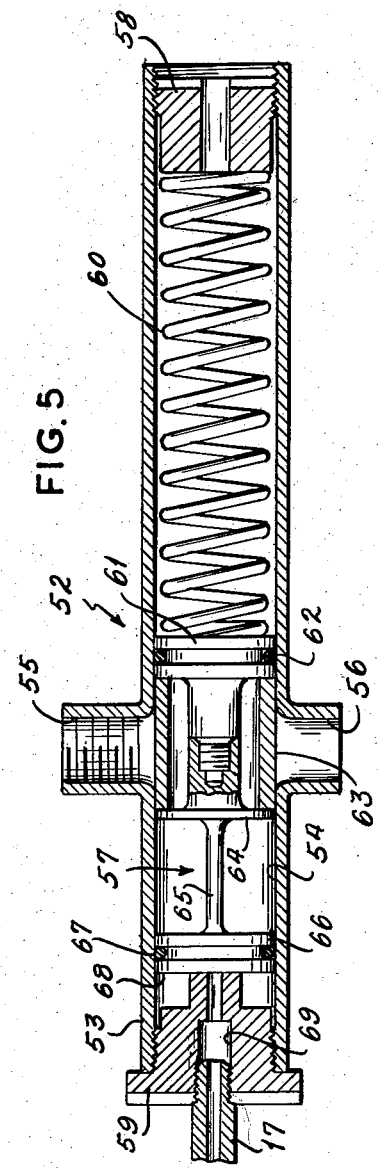

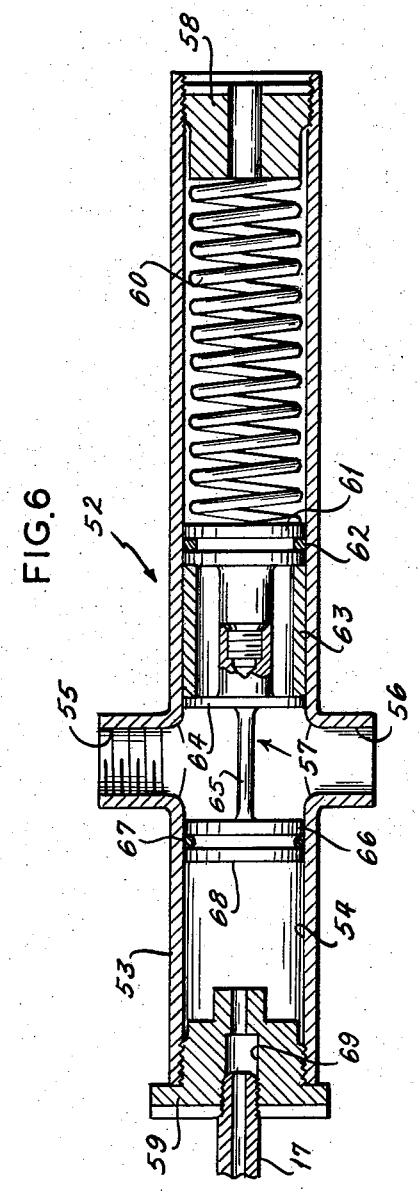

3,101,187
FLUID PRESSURE OPERATED PISTON VALVE
Phillip B. Campbell, Redlands, Calif., assignor to Wagner Electric Corporation, St. Louis, Mo., a corporation of Delaware
Filed Sept. 12, 1960, Ser. No. 55,245
4 Claims. (Cl. 251—63)

The present invention relates to fluid compressors and more particularly to a valve mechanism for unloading the compressor.

An object of the present invention is to provide an improved valve mechanism which automatically unloads a compressor when the fluid pressure in the receiver or pressure tank of the system is a predetermined value.

Another object is to provide an unloader valve particularly suitable for use with a reciprocating type automotive air compressor. Whereas when some of the present automotive air compressors are unloaded the air is shuttled back and forth in the cylinders and heated to a temperature sufficiently high to cause carbonization of the lubricating oil, the present invention produces low compressor unloading air temperatures and subsequently little carbonization of lubricating oil. Furthermore, the compressor unloading valve discharges to atmosphere, thus carrying away any lubricant that may leak past the rings and further reducing any tendency of the oil to carbonize.

It is therefore an object to provide an unloader valve which reduces the carbonization of lubricating oil in the compressor. Another object is to provide an unloader valve for a compressor system which discharges compressed fluid to the atmosphere when in unloading position.

Another object of the present invention is to provide a novel fluid pressure balanced mechanism to unload a compressor. Still another object is to provide a combination spring and fluid balanced unloader valve mechanism for a compressor.

These and other objects and advantages will become apparent hereinafter.

The present invention comprises an unloader valve for a compressor system whereby the discharge side of the compressor is vented through the valve to the atmosphere when the fluid pressure in the receiver reaches a predetermined level.

The invention also consists in the parts and in the arrangements and combinations of parts hereinafter described and claimed.

In the drawings, wherein like numerals refer to like figures:

FIG. 1 is a diagrammatic view of a compressor system in combination with a preferred form of the present unloader valve, FIG. 2 is a sectional view of the present invention showing the valve in unloading position, FIG. 3 is a sectional view similar to FIG. 2, but showing the valve in loading position, FIG. 4 is a diagrammatic view of a modified compressor system in combination with a modification of the present unloader valve, FIG. 5 is a sectional view of the modified unloader valve shown in FIG. 4 showing the valve in loading position, and FIG. 6 is a view similar to FIG. 5, but showing the valve in unloading position.

FIG. 1 shows a compressor system 10 including a reciprocating compressor 11, a compressor discharge line 12, an unloader valve 13, a check valve 14 in an inlet line 15 to a receiver or reservoir 16, a passageway or conduit 17 connecting the receiver 16 and one end of the unloader valve 13, a conduit 18 connecting the receiver 16 and the second end of the valve 13, and a governor 19 in the line 18 to controllably admit reservoir air to the second end of the valve 13.

The compressor 11 can be either single stage or multiple stage having the usual intake manifold, compression cylinders including pistons and rings, and a discharge valve. When compressors of this type are unloaded, the air in the cylinders is shuttled back and forth between the cylinders and is heated to a relatively high temperature, which causes carbonization of any lubricating oil which may leak past the rings. Leakage is increased when pressure in the cylinders is low, as during unloading, and carbonization of lubricating oil is a function of temperature and time, i.e., the longer time oil is exposed to high temperatures, the greater is the carbonization. The present unloader valve 13 obviates the carbonization of lubricating oil on the compressor parts by discharging the compressed fluid to the atmosphere through the unloader valve 13 as will be explained more fully hereinafter.

Since the air is discharged from the compressor 11 to the atmosphere and is not shuttled back and forth between the cylinders, there are no high temperatures during the unloading cycle and the inlet manifold temperature remains low. Since the leakage of oil past the rings is greatest during the unloading, the accumulation of oil in the lines and in the receiver is held to a minimum because any oil that does leak into the cylinders is immediately carried to the atmosphere. The immediate discharge of oil to the atmosphere also reduces carbonization because it is subjected to high temperature only for a short period of time not sufficient to carbonize the oil.

The unloader 13 is shown in more detail in FIGS. 2 and 3, FIG. 2 showing the valve 13 in an open or unloading position, and FIG. 3 showing the valve 13 in closed or loading position.

The valve 13 includes a valve housing 20 having a bore 21 therethrough. The compressor discharge line 12 from the pressure side of the compressor 11 communicates with the bore 21 through an unloader port 22. A discharge or exhaust port 23 connects the bore 21 and the unloader port 22 to the atmosphere, when the unloader valve 13 is in discharging position shown in FIG. 2.

Housed and slidably received in the bore 21 is a slide type valve or piston 24. The piston 24 includes a first end member 25 having a reservoir pressure receiving surface 26, an outer margin 27 slidably engaging the bore 21 and a channel 28 housing a seal member 29 for a pressure tight sealing engagement with the bore 21. An elongated arm or reduced portion 30 connects the first end member 25 to a second end member 31. The second end member 31 has an outer margin 32 slightly engaging the bore 21, a shoulder 33 and an internally threaded rim 34.

One end of a plug 35 having a bore 36 therethrough engages the threaded rim 34, and the other end thereof defines an enlarged portion 37, housing a seal means 38 and slidably engaging the bore 21. The enlarged end 37 is defined by an internal shoulder 39 and a reservoir pressure receiving surface 40. The shoulders 33 and 39 define an elongated channel 41 loosely mounting a deformable seal member or sleeve 42.

A stationary piston or bore closure member 43 is positioned at the end of the valve housing 20 and is threaded to the bore 21. The piston 43 has an internal shoulder 44 joining an elongated finger or extension 45 received in the plug bore 36 and housing seal means 46 providing a pressure tight seal with the plug cylinder 36. The piston 43 has a bore 47 therein communicating with the second end member 31 which is vented to the atmosphere at aperture 48. The plug 35 is axially slidable on the finger 45 when the valve 24 is moved between loading and unloading positions.

The conduit 17 is received in a control port 49 in the valve housing 20 and connects the receiver 16 to the plug pressure receiving face 40 defined by the bore 36 and the outer margin of the plug enlarged portion 37. Thus, the receiver pressure acts at all times on the face 40 urging the plug 35, the deformable sleeve 42 and the valve second end member 31 toward the air discharge port 23.

The conduit 18 connects the reservoir 16 to a control port 50 in a plug 51 threadedly fixed to the end of the bore 21 nearer the pressure receiving surface 26. The governor 19 in the line 18 between the port 50 and the receiver 16 acts to controllably admit receiver pressure to the surface 26 (FIG. 1). When the receiver 16 is connected to the bore 21 through the port 50, the receiver pressure acts on the surface 26, whose area is substantially the same as the cross sectional area of the bore 21, urging the valve first end member 25 toward the discharge port 23 and toward the valve open position shown in FIG. 2. When the governor 19 connects the bore 21 to the atmosphere, the receiver pressure acting on the surface 40 urges the valve toward the closed position shown in FIG. 3.

The governor 19 can be any standard type well known in the art which acts to alternately connect the conduit 18 to the receiver 16 and to the atmosphere when the receiver pressure is a predetermined level.

The operation of the unloader valve mechanism 13 will be described starting with the valve 13 in the closed or loading position shown in FIG. 3, wherein the compressor 11 discharges compressed fluid through the line 12, past the check valve 14, and through the line 15 into the receiver 16. The pressure in the receiver 16 constantly acts on the piston end area 40 through the line 17 to urge the piston 24 into closed position (FIG. 3) with the deformable sleeve 42 interrupting communication between the axially aligned ports 22 and 23. When the receiver pressure has built up to a predetermined level, the governor 19 acts to admit fluid pressure through the line 18 and the port 50 against the surface 26. Since the area of the surface 26 is greater than the area of the surface 40, the piston 24 is urged into an open position (FIG. 2), and the compressor 11 discharges to the atmosphere through ports 22 and 23. The receiver pressure closes the check valve 14 and the compressed fluid from the compressor 11 takes the path of least resistance to the atmosphere through the unloader valve 13.

When the pressure in the receiver 16 falls to a predetermined level, the governor 19 closes off the receiver pressure to the surface 26 and vents said surface 26 to the atmosphere through the conduit 18. The receiver pressure is still acting on the piston end surface 40 and urges the piston 24 to a closed position (FIG. 3) where the compressed fluid again opens the check valve 14 and passes to the receiver 16. When the pressure in the receiver 16 reaches a relatively higher predetermined level, the governor 19 admits receiver pressure to the surface 26 through the conduit 18 and the piston 24 moves to an open position and the procedure continues as hereinbefore described.

The alternate system and modified valve mechanism shown in FIGS. 4–6, includes a reciprocating compressor 11, a compressor discharge line 12, an unloader valve 52, a check valve 14 in compressed fluid inlet line 15 to a receiver 16, a conduit 17 connecting one end of the valve 52 with the receiver 16, and a governor 17a in the conduit 17 to alternately connect the conduit 17 to the reservoir 16 or to atmosphere depending upon reservoir pressure.

The modified valve 52 is shown in more detail in FIGS. 5 and 6, FIG. 5 showing the valve in a closed or compressor loading position, and FIG. 6 showing the valve in an open or compressor unloading position.

The valve 52 includes a valve housing 53 having a bore 54 therethrough with an unloader port 55 and a discharge port 56, a piston assembly 57 housed in the bore 54, and threaded end plugs 58 and 59 fitted to either end of the valve housing 53.

The piston assembly 57 includes a resilient means, such as a spring 60, positioned between the end plug 58 and a spring seat member 61. The spring seat member 61 retains a seal means 62 to provide a pressure tight seal between the bore 54 and the spring seat 61. A deformable seal means or sleeve 63 is loosely carried by the piston 57 between the spring seat member 61 and an intermediate plate 64. The seal means 63 is positioned between the unloader port 55 and the discharge or exhaust port 56 to interrupt communication therebetween during the loading operation (FIG. 5). An elongated arm or reduced portion 65 connects the intermediate plate 64 with an end plate 66 housing a seal means 67 and having a reservoir pressure receiving surface 68. An aperture or control port 69 in the end plug 59 connects the line 17 to the bore 54.

In operation with the valve 52 in the position of FIG. 5, the compressor 11 provides fluid under pressure through the lines 12 and 15 and past the check valve 14 to the reservoir 16. The reservoir pressure is built up until it reaches a predetermined level, at which point the governor 17a connects the reservoir 16 to the bore 54 through the conduit 17. The receiver pressure acting on the surface 68 urges and moves the piston assembly 57 toward the spring 60, compressing it (FIG. 6). As the spring seat 61 compresses the spring 60, the sleeve 63 opens up communication between the unloader port 55 and the discharge port 56. Since the compressed fluid from the compressor 11 takes the path of least resistance, the receiver pressure seats the check valve 14 and the compressor 11 discharges through the conduit 12 and the ports 55 and 56 to the atmosphere.

As soon as the receiver pressure decreases to a predetermined level, the governor 17a vents the surface 68 to the atmosphere through the conduit 17 and the spring 60 moves the piston assembly 57 and sleeve 63 toward the position shown in FIG. 5 to interrupt communication between the ports 55 and 56. When the discharge port 56 is sealed, the compressed fluid again opens the check valve 14 and passes to the receiver 16 through the conduit 15.

Since both of the modifications shown discharge or unload directly to the atmosphere, any oil in the cylinders is carried out of the system to the atmosphere.

The loosely mounted deformable sleeve members 42 and 63 provide a positive seal between the unloading and exhaust ports and allow for tolerances between the slidable piston and the bore. Also, the piston members can float in the bores without leakage between the unloading and exhaust ports.

Thus it is apparent that the present invention achieves all of the desired objects and advantages hereinbefore set forth.

The present invention is intended to include all changes and modifications of the examples of the invention herein chosen for purposes of disclosure, which do not constitute departures from the spirit and scope of the invention.

What I claim is:

1. A compressor unloading valve comprising a housing having a bore therein, axially aligned exhaust and unloading ports intersecting said bore near the mid-portion thereof, piston means slidable in said bore, opposed ends on said piston means having different end areas, expansible chambers in said bore adjacent said ends, control ports connected with said chambers, a deformable sleeve loosely mounted on said piston means, and a reduced portion on said piston means between said sleeve and one of said ends, said piston means being movable to position said reduced portion in alignment with said exhaust and unloading ports to open communication therebetween when the pressures in said chambers are substantially equal, and said piston means being movable to position said sleeve in sealing engagement between said exhaust and unloading ports to close communication therebetween in response only to a predetermined fluid pressure differential between said chambers.

2. A compressor unloading valve comprising a housing having a bore therein, axially aligned exhaust and unloading ports provided in said bore near the mid-portion thereof, piston means slidable in said bore controlling said exhaust and unloading ports, opposed ends on said piston means sealably engaged with said bore, expansible chambers in said bore adjacent said ends, control ports connected with said chambers, a bore closure member, an extension on said member coaxially positioned in said bore, a bore in said piston means extending through one of said ends and slidably receiving said extension, said one end thereby having a lesser effective area than the other of said ends, a deformable sleeve loosely mounted on the peripheral surface of said piston means adjacent said one end and adapted for positive sealable engagement between said exhaust and unloading ports, a reduced portion on said piston means between said sleeve and other end and adapted for alignment with said exhaust and unloading ports, said piston means being movable to one position in said bore to align said reduced portion with said exhaust and unloading ports and to another position on said bore to sealably engage said sleeve between said exhaust and unloading ports to establish and interrupt communication between said exhaust and unloading ports when the forces created only by the control pressures in said chambers acting on the effective area of said one and other ends are unbalanced in the direction of said one and other ends, respectively.

3. A compressor unloader valve comprising a housing having a bore therein, axially aligned exhaust and unloading ports in said bore, piston means slidable in said bore and having opposed ends, expansible chambers in said bore adjacent said ends, a control port connecting with one of said chambers, a deformable sleeve loosely mounted on said piston means adjacent one of said ends, a reduced portion on said piston means between said sleeve and the other of said ends, and resilient means in the other of said chambers normally biasing said piston means to a position aligning said sleeve in sealable engagement between said exhaust and unloading ports to interrupt communication therebetween when the pressure in said one chamber is below a predetermined amount, said piston means being movable against the compressive force of said resilient means only in response to pressure in said one chamber above a predetermined amount to align said reduced portion with said exhaust and unloading ports and establish communication therebetween, said piston means being movable only by said resilient means to interrupt communication between said exhaust and unloading ports when the pressure in said one chamber is below a predetermined amount.

4. A compressor unloader valve comprising a housing having a bore therein, axially aligned exhaust and unloading ports positioned in said bore near the mid-portion thereof, piston means slidable in said bore controlilng communication between said ports, said piston means having opposed ends in sealable engagement with the side walls of said bore, expansible chambers in said bore adjacent said opposed ends, a deformable sleeve loosely mounted on the peripheral portion of said piston means adjacent one of said ends and adapted for alignment with said ports to interrupt communication therebetween, a reduced portion on said piston means positioned axially between said sleeve and the other of said ends and adapted for alignment with said ports to establish communication therebetween, a control port in fluid pressure communication with one of said chambers, and a spring in the other of said chambers interposed between one of the end walls of said bore and said other end of said piston means, the compressive force of said spring normally biasing said one end of said piston means into abutment with the other of the end walls of said bore to align said sleeve in sealable engagement between said exhaust and unloading ports and interrupt communication therebetween when the control pressure in said one chamber is less than a predetermined amount, said piston means being movable only against the compressive force of said spring in response to the control pressure in said one chamber above a predetermined amount to align said reduced portion with said exhaust and unloading ports and establish communication therebetween, said piston means being movable only by said resilient means to interrupt communication between said exhaust and unloading ports when the pressure in said one chamber is below a predetermined amount.

References Cited in the file of this patent

UNITED STATES PATENTS

| 1,000,022 | Ledoux | Aug. 8, 1911 |
| 1,207,436 | Ohlsen | Dec. 5, 1916 |
| 1,336,301 | Kingsbury | Apr. 6, 1920 |
| 1,771,413 | McCune | July 29, 1930 |
| 2,191,162 | Schnell | Feb. 20, 1940 |
| 2,327,830 | Stevenson et al. | Aug. 24, 1943 |
| 2,393,571 | Schultz | Jan. 22, 1946 |
| 2,395,941 | Rockwell | Mar. 5, 1946 |
| 2,420,394 | Gilman | May 13, 1947 |
| 2,421,133 | Towler et al. | May 27, 1947 |
| 2,584,638 | Staude | Feb. 5, 1952 |
| 2,675,172 | Anderson | Apr. 13, 1954 |
| 2,697,548 | Janicke | Dec. 21, 1954 |
| 2,779,346 | Curlett | Jan. 29, 1957 |
| 2,815,714 | Jacobson | Dec. 10, 1957 |
| 2,920,645 | Younghaus | Jan. 12, 1960 |
| 2,988,105 | Soderberg et al. | June 13, 1961 |

FOREIGN PATENTS

| 225,966 | Great Britain | Dec. 18, 1924 |